US 7,720,300 B1

(12) United States Patent
Malladi et al.

(10) Patent No.: US 7,720,300 B1
(45) Date of Patent: May 18, 2010

(54) SYSTEM AND METHOD FOR EFFECTIVELY PERFORMING AN ADAPTIVE QUANTIZATION PROCEDURE

(75) Inventors: Krishna Mohan Malladi, San Jose, CA (US); B. Anil Kumar, Saratoga, CA (US); Neal Margulis, Woodside, CA (US)

(73) Assignee: Calister Technologies, San Jose, CA (US)

( * ) Notice: Subject to any disclaimer, the term of this patent is extended or adjusted under 35 U.S.C. 154(b) by 833 days.

(21) Appl. No.: 11/633,813

(22) Filed: Dec. 5, 2006

(51) Int. Cl.
G06K 9/00 (2006.01)
(52) U.S. Cl. ........................ 382/251; 382/240
(58) Field of Classification Search ................ 382/251, 382/240, 107; 375/241; 341/51; 704/500, 704/503, 200, 229; 381/56
See application file for complete search history.

(56) References Cited

U.S. PATENT DOCUMENTS

| | | | |
|---|---|---|---|
| 5,602,589 A | 2/1997 | Vishwanath | |
| 5,708,961 A | 1/1998 | Hylton | |
| 5,764,698 A * | 6/1998 | Sudharsanan et al. | 375/241 |
| 5,850,482 A | 12/1998 | Meaney | |
| 5,852,437 A | 12/1998 | Wugofski | |
| 5,909,518 A | 6/1999 | Chui | |
| 5,911,582 A | 6/1999 | Redford | |
| 5,977,933 A | 11/1999 | Wicher | |
| 6,031,940 A | 2/2000 | Chui | |
| 6,075,906 A | 6/2000 | Fenwick | |
| 6,097,441 A | 8/2000 | Allport | |
| 6,104,334 A | 8/2000 | Allport | |
| 6,141,059 A | 10/2000 | Boyce | |
| 6,141,447 A | 10/2000 | Linzer | |
| 6,222,885 B1 | 4/2001 | Chadda | |
| 6,263,503 B1 | 7/2001 | Margulis | |
| 6,340,994 B1 | 1/2002 | Margulis | |
| 6,409,602 B1 | 6/2002 | Wiltshire | |
| 6,437,803 B1 | 8/2002 | Panasyuk | |
| 6,456,340 B1 | 9/2002 | Margulis | |
| 6,510,177 B1 | 1/2003 | De Bonet | |
| 6,600,838 B2 | 7/2003 | Chui | |
| 6,611,530 B1 | 8/2003 | Apostolopoulos | |
| 6,628,716 B1 | 9/2003 | Tan | |
| 6,658,019 B1 | 12/2003 | Chen | |
| 6,701,380 B2 | 3/2004 | Schneider et al. | |
| 6,721,837 B2 | 4/2004 | MacInnis | |
| 6,754,266 B2 | 6/2004 | Bahl | |
| 6,757,851 B1 | 6/2004 | Park | |
| 6,768,775 B1 | 7/2004 | Wen | |

(Continued)

OTHER PUBLICATIONS

Skodras et al., "JPEG2000: The Upcoming Still Image Compression Standard," May 11, 2000, 14 pages.

(Continued)

*Primary Examiner*—Anh Hong Do
(74) *Attorney, Agent, or Firm*—Woodcock Washburn LLP

(57) ABSTRACT

A system and method for effectively performing an adaptive quantization procedure includes an energy calculator that initially determines energy values for subbands of input data. A quantizer receives initial quantization parameters that each correspond to a different respective one of the subbands. The quantizer calculates adaptive quantization parameters from the initial quantization parameters by utilizing corresponding ones of the energy values. The quantizer then utilizes the adaptive quantization parameters to generate quantized coefficients for the subbands during the adaptive quantization procedure.

22 Claims, 8 Drawing Sheets

U.S. PATENT DOCUMENTS

| | | | |
|---|---|---|---|
| 6,771,828 | B1 | 8/2004 | Malvar |
| 6,774,912 | B1 | 8/2004 | Ahmed et al. |
| 6,781,601 | B2 | 8/2004 | Cheung |
| 6,785,700 | B2 | 8/2004 | Masud |
| 6,798,838 | B1 | 9/2004 | Ngo |
| 6,807,308 | B2 | 10/2004 | Chui |
| 6,816,194 | B2 | 11/2004 | Zhang |
| 6,826,242 | B2 | 11/2004 | Ojard |
| 6,834,123 | B2 | 12/2004 | Acharya |
| 6,839,079 | B2 | 1/2005 | Barlow |
| 6,842,777 | B1 | 1/2005 | Tuli |
| 6,847,468 | B2 | 1/2005 | Ferriere |
| 6,850,571 | B2 | 2/2005 | Tardif |
| 6,850,649 | B1 | 2/2005 | Malvar |
| 6,853,385 | B1 | 2/2005 | MacInnis |
| 6,868,083 | B2 | 3/2005 | Apostolopoulos |
| 6,898,583 | B1 | 5/2005 | Rising |
| 7,050,980 | B2 * | 5/2006 | Wang et al. ............... 704/503 |

OTHER PUBLICATIONS

Gary C. Kessler, "An Overview of TCP/IP Protocols and the Internet," InterNIC Document, Dec. 29, 2004, 42 pages.

Eric J. Balster, "Video Compression and Rate Control Methods Based on the Wavelet Transform," The Ohio State University, 2004, pp. 1-24.

Taubman et al., "Embedded Block Coding in JPEG2000," Feb. 23, 2001, pp. 1-8 of 36, Hewlett-Packard, Palo Alto CA.

Kulapala et al., "Comparison of Traffic and Quality Characteristics of Rate-Controlled Wavelet and DCT Video," Oct. 11, 2004, 6 pages, Arizona State University, Tempe AZ.

"Remote Desktop Protocol," Platform SDK: Terminal Services, Jun. 2005, 2 pages, Microsoft Corporation Web Site, Redmond WA.

"Matrox QID Pro" Jun. 2005, 3 pages, Matrox Graphics web site product specification, Matrox Electronic Systems Ltd, Dorval, Quebec, Canada.

Ian Griffiths, "A First Look at 3-D Support in Avalon," Jun. 2004, 11 pages, Microsoft Corporation Web Site, Redmond WA.

Wee et al., "Transcoding MPEG Video Streams in the Compressed Domain," HP Image and Data Compression Conference, Mar. 13, 1997, 10 pages, Hewlett-Packard, Palo Alto CA.

Luk Verboven, "Wireless Technology Update," Anixter Technology Group, 5 pages, Mar. 2004, reprints from Network World, Mar. 29, 2004 and unattributed.

Bejerano et al., "A Framework for Fairness and QoS Assurance in Current IEEE 802.11 Networks . . . " IEEE INFOCOM 2004, 12 pages, Bell Labs, Murray Hill NJ.

Lindgren et al., "Quality of Service Schemes for IEEE 802.11," 7 pages, Lulea University of Technology, Lulea, Sweden.

Godfrey, "Inside 802.11e: Making QoS a Reality over WLAN Connections," GlobespanVirata, Dec. 19, 2003, 8 pages, http://www.commsdesign.com/showArticle.jhtml?articleID=17000388.

* cited by examiner

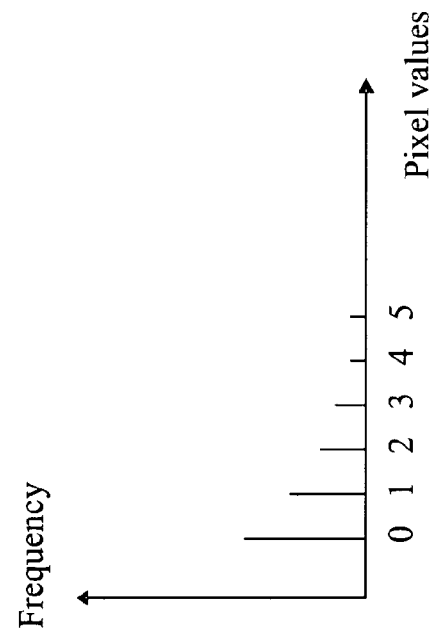
Fig. 6B
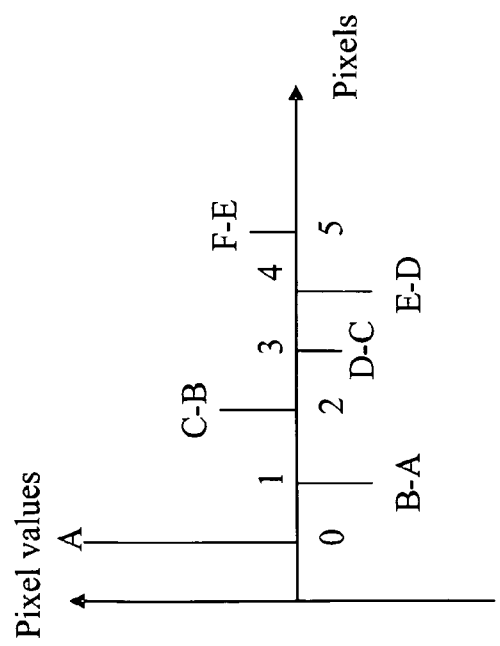
Fig. 6D
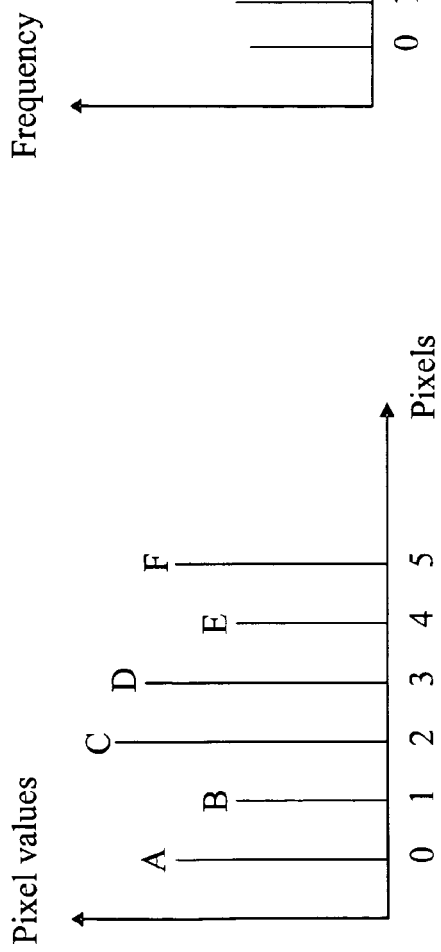
Fig. 6A
Fig. 6C

SYSTEM AND METHOD FOR EFFECTIVELY PERFORMING AN ADAPTIVE QUANTIZATION PROCEDURE

BACKGROUND SECTION

1. Field of Invention

This invention relates generally to techniques for processing electronic information, and relates more particularly to a system and method for effectively performing an adaptive quantization procedure.

2. Description of the Background Art

Implementing effective methods for processing electronic information is a significant consideration for designers and manufacturers of contemporary electronic devices. However, effectively implementing electronic devices may create substantial challenges for device designers. For example, enhanced demands for increased device functionality and performance may require more system processing power and require additional hardware or software resources. An increase in processing or hardware requirements may also result in a corresponding detrimental economic impact due to increased production costs and operational inefficiencies.

Furthermore, enhanced device capability to perform various advanced operations may provide additional benefits to a system user, but may also place increased demands on the control and management of various system components. For example, an enhanced electronic device that effectively processes image data may benefit from an efficient implementation because of the large amount and complexity of the digital data involved.

Due to growing demands on system resources and substantially increasing data magnitudes, it is apparent that developing new techniques for implementing and utilizing electronic devices is a matter of concern for related electronic technologies. Therefore, for all the foregoing reasons, developing effective techniques for processing electronic information remains a significant consideration for designers, manufacturers, and users of contemporary electronic devices.

SUMMARY

In accordance with the present invention, a system and method are disclosed for effectively performing an adaptive quantization procedure. In one embodiment of the invention, a quantizer initially receives image data in the form of subbands from a discrete wavelet transform (DWT) module. A denoising module of the quantizer performs a denoising procedure to remove subband coefficients that are less than a predetermined denoising threshold value. The denoising module then provides the denoised subbands to a quantization module and to an energy calculator.

The energy calculator determines an average subband energy value (AV) for each denoised subband by utilizing any appropriate techniques. A QP selector selects initial quantization parameters based upon feedback from an entropy encoder, and provides the initial quantization parameters to the quantization module. The quantization module initially calculates modified average subband energy values by dividing the average subband energy values by corresponding respective reduction factors. The reduction factors may be implemented as selectable values that correspond to the subband level of a given denoised subband. For example, a high subband level may be associated with a low reduction factor, a medium subband level may be assigned a medium reduction factor, and a low subband level may be associated with, a high reduction factor.

The quantization module also calculates comparison QP values for each denoised subband based upon current quantization parameters that are initially equal to the initial quantization parameters provided by the QP selector. The quantization module performs a comparison procedure, on a subband-by-subband basis, to determine whether a respective modified average subband energy is greater than a corresponding comparison QP value. If the modified subband energy is greater than the comparison QP value, then the quantization module iteratively increments the current quantization parameter by a value of one.

However, if the modified subband energy is not greater than the comparison QP value, then the quantization module utilizes the current quantization parameter as a final adaptive quantization parameter for performing an adaptive quantization procedure to generate quantized coefficients for the corresponding subband. The quantization module also determines whether to perform a differential encoding procedure on each set of quantized coefficients by analyzing the subband level of each set of quantized coefficients. For example, the quantization module may be programmed to perform differential encoding only on quantized coefficients from the low subband level(s).

If the quantization module determines that differential encoding is required, then a differential encoder performs a differential encoding procedure on the appropriate sets of quantized coefficients. The quantization module may then provide the quantized coefficients and the adaptive quantization parameters for all subbands to the entropy encoder for further processing. For at least the foregoing reasons, the present invention therefore provides an improved a system and method for effectively performing an adaptive quantization procedure.

BRIEF DESCRIPTION OF THE DRAWINGS

FIGS. 6A through 6D are exemplary graphs illustrating a differential encoding procedure, in accordance with one embodiment of the present invention;

DETAILED DESCRIPTION

The present invention relates to an improvement in electronic information processing systems. The following description is presented to enable one of ordinary skill in the art to make and use the invention, and is provided in the context of a patent application and its requirements. Various modifications to the disclosed embodiments will be readily apparent to those skilled in the art, and the generic principles herein may be applied to other embodiments. Thus, the present invention is not intended to be limited to the embodiments shown, but is to be accorded the widest scope consistent with the principles and features described herein.

The present invention is described herein as a system and method for effectively performing an adaptive quantization procedure, and includes an energy calculator that initially determines energy values for subbands of input image data. A quantizer receives initial quantization parameters that each correspond to a different respective one of the subbands. The quantizer calculates adaptive quantization parameters from the initial quantization parameters by utilizing corresponding ones of the energy values. The quantizer then utilizes the adaptive quantization parameters to generate quantized coefficients for each of the subbands during the adaptive quantization procedure.

Figure 1:
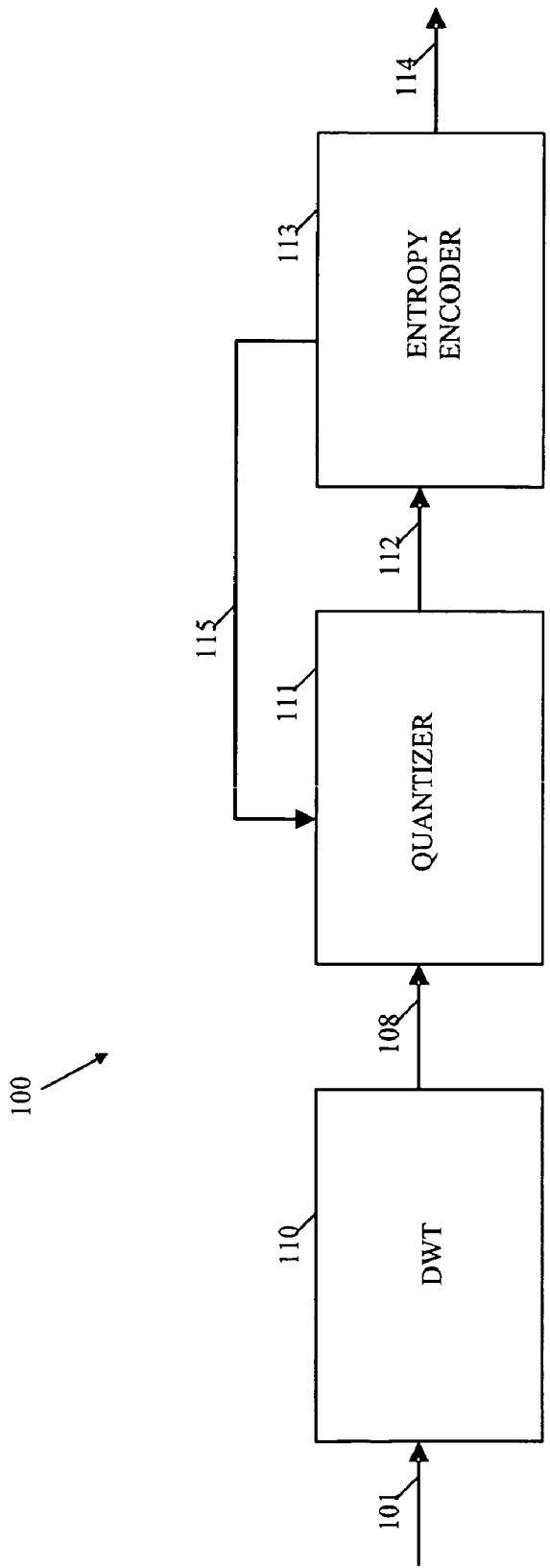
FIG. 1 is a block diagram for one embodiment of an encoder, in accordance with the present invention.

Referring now to FIG. 1, a block diagram of an encoder 100 is shown, in accordance with one embodiment of the present invention. In alternate embodiments, encoder 100 may be implemented using components and configurations in addition to, or instead of, certain of those components and configurations discussed below in conjunction with the FIG. 1 embodiment. For example, in the FIG. 1 embodiment, encoder 100 is discussed in the context of processing image data. However, in alternate embodiments, certain concepts and techniques from the present invention may be similarly utilized for processing other types of electronic information.

In the FIG. 1 embodiment, encoder 100 initially receives an image 101 as a frame of image data from any appropriate data source. For example, in certain embodiments, image 101 is divided into individual tiles that are implemented as contiguous sections of image data from image 101. The individual tiles may be configured in any desired manner. For example, in certain embodiments, an individual tile may be implemented as a pixel array that is 128 pixels wide by 128 pixels high. In addition, the foregoing tiles may be configured in any appropriate format. In certain embodiments, the tiles of image 101 are presented in a know YUV color format.

In the FIG. 1 embodiment, a discrete wavelet transform module (DWT) 110 performs a known discrete wavelet transform procedure to transform the individual YUV components of the tiles into corresponding subbands 108 that each include a series of coefficients. In the FIG. 1 embodiment, a quantizer module 111 next performs an adaptive quantization procedure by utilizing appropriate adaptive quantization techniques to compress the subbands into quantized coefficients 112. In the FIG. 1 embodiment, quantizer 111 produces the quantized coefficients 112 by separately reducing the bit rate of each of the subbands according to respective compression ratios that are specified by corresponding adaptive quantization parameters. In certain embodiments, quantizer 111 may also perform a differential encoding procedure upon the quantized coefficients 112. Additional details of discrete wavelet transforms and quantization procedures are further discussed in "The JPEG 2000 Still Image Compression Standard," by Athanassios Skodras et al., published in IEEE Signal Processing Magazine, September 2001.

In the FIG. 1 embodiment, entropy encoder 113 performs an entropy encoding procedure to generate encoded data 114 to any desired data destination. In certain embodiments, the entropy encoding procedure further reduces the bit rate of the quantized coefficients 112 by substituting appropriate codes for corresponding bit patterns of the quantized coefficients 112 received from quantizer 111. In certain embodiments, entropy encoder 113 may perform an entropy encoding procedure in accordance with a known H.264 CABAC standard. Further details about the H.264 CABAC encoding process are discussed in "Context-Based Adaptive Binary Arithmetic Coding," by Marpe, Detlev, et al., in the H.264/AVC Video Compression Standard, IEEE Transactions On Circuits And Systems For Video Technology, Vol. 13, No. 7, July 2003.

In the FIG. 1 embodiment, entropy encoder 113 also provides an initial quantization parameter 115 via a feedback loop to quantizer 111 for generating the adaptive quantization parameter discussed above. In the FIG. 1 embodiment, entropy encoder 113 may select the initial quantization parameter 115 by utilizing any appropriate techniques. For example, in certain embodiments, initial quantization parameter 115 may be selected to provide a desired level of picture quality characteristics in encoded data 114. Entropy encoder 113 may monitor picture quality of encoded data 114 by utilizing any appropriate criteria or techniques.

In the FIG. 1 embodiment, entropy encoder 113 may adjust initial quantization parameter 115 to decrease the amount of compression if encoded data 114 exhibits unacceptable picture quality. Conversely, if there is decreased network bandwidth on shared IP networks, the entropy encoder 113 may adjust initial quantization parameter 115 to increase the amount of compression if the picture quality of encoded data 114 is not particularly critical. In addition, the rate controller may adjust initial quantization parameter 115 to decrease the amount of compression in quantized coefficients 112 when available memory and/or transmission bandwidth becomes relatively scarce. Conversely, the rate controller may adjust initial quantization parameter 115 to increase compression levels of quantized coefficients 112 when available memory and/or transmission bandwidth is plentiful and improved picture quality would be beneficial. Various embodiments for implementing and utilizing encoder 100 are further discussed below in conjunction with FIGS. 3-7.

In the FIG. 1 embodiment, encoder 100 is disclosed and discussed as being implemented primarily as hardware circuitry. In certain embodiments, encoder 100 may be implemented as a single integrated-circuit device. However, in alternate embodiments, some or all of the functions of the present invention may be performed by appropriate software instructions or otherwise configurable means that are executed to effectively perform various functions discussed herein.

Figure 2:
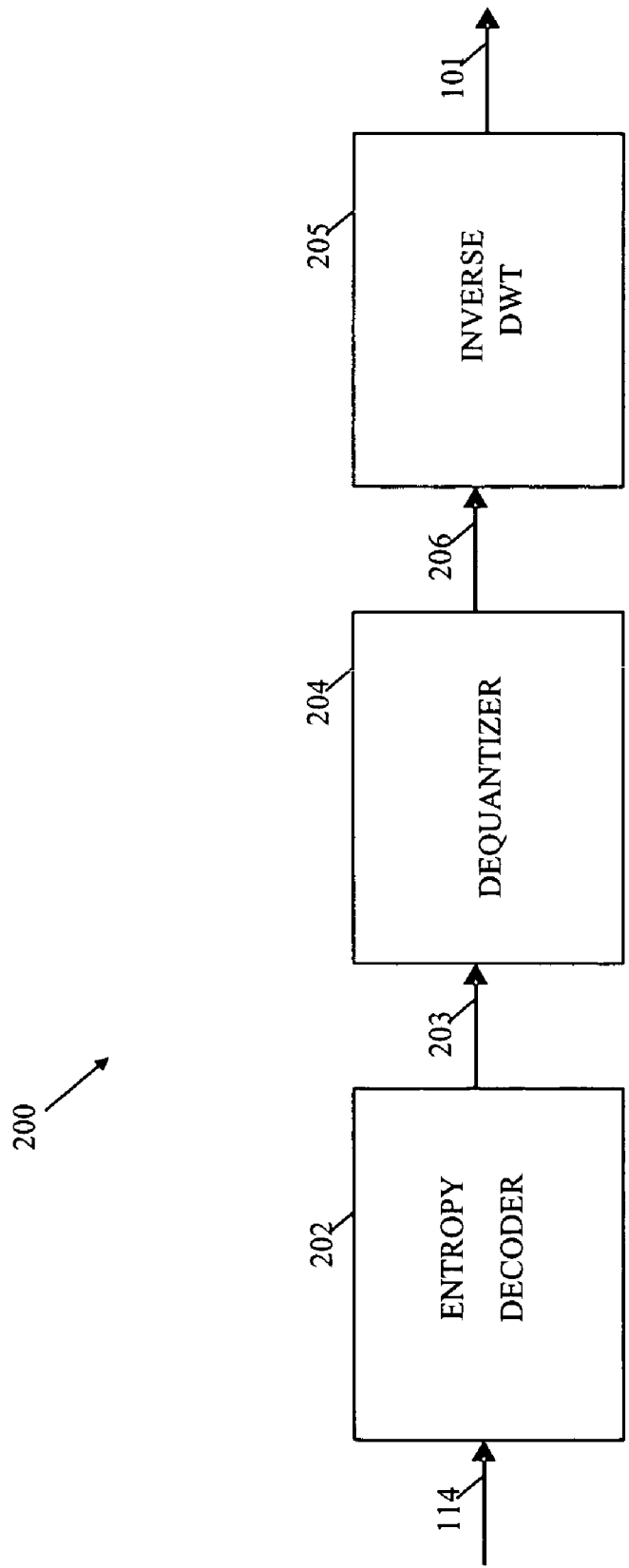
FIG. 2 is a block diagram for one embodiment of a decoder, in accordance with the present invention.

Referring now to FIG. 2, a block diagram of a decoder 200 is shown, in accordance with one embodiment of the present invention. In alternate embodiments, decoder 200 may be implemented using components and configurations in addition to, or instead of, certain of those components and configurations discussed in conjunction with the FIG. 2 embodiment. For example, in the FIG. 2 embodiment, decoder 200 is discussed in the context of processing image data. However, in alternate embodiments, certain concepts and techniques from the present invention may be similarly utilized for processing other types of electronic information.

In the FIG. 2 embodiment, decoder 200 initially receives encoded data 114 that is provided from one or more data sources in any appropriate encoding format. In the FIG. 2 embodiment, an entropy decoder 202 performs an entropy decoding procedure to effectively convert encoded data 114 into quantized coefficients 203. In certain embodiments, the entropy decoding procedure increases the bit rate of encoded data 114 by substituting appropriate bit patterns for corresponding codes in the encoded data 114 to produce quantized coefficients 203.

A dequantizer 204 next performs a dequantization procedure by utilizing appropriate dequantization techniques for decompressing the quantized coefficients 203 to produce various corresponding subbands 206 that each include a series of coefficients. For example, in certain embodiments, dequantizer 204 produces the subbands 206 by performing dequantization based upon respective quantization settings of quantizer 111 (FIG. 1) during the encoding procedure. In certain embodiments, dequantizer 204 may also perform a differential decoding procedure upon subbands 206. In the FIG. 2 embodiment, an inverse discrete wavelet transform module (inverse DWT) 205 performs a known inverse discrete wavelet transform procedure to reverse a corresponding discrete wavelet transform procedure by converting individual subbands into a corresponding image 101 that may be provided to any desired data destination.

In the FIG. 2 embodiment, decoder 200 is disclosed and discussed as being implemented primarily as hardware circuitry. In certain embodiments, decoder 200 may be implemented as a single integrated-circuit device. However, in alternate embodiments, some or all of the functions of the present invention may be performed by appropriate software instructions that are executed to effectively perform various functions discussed herein.

Figure 3:
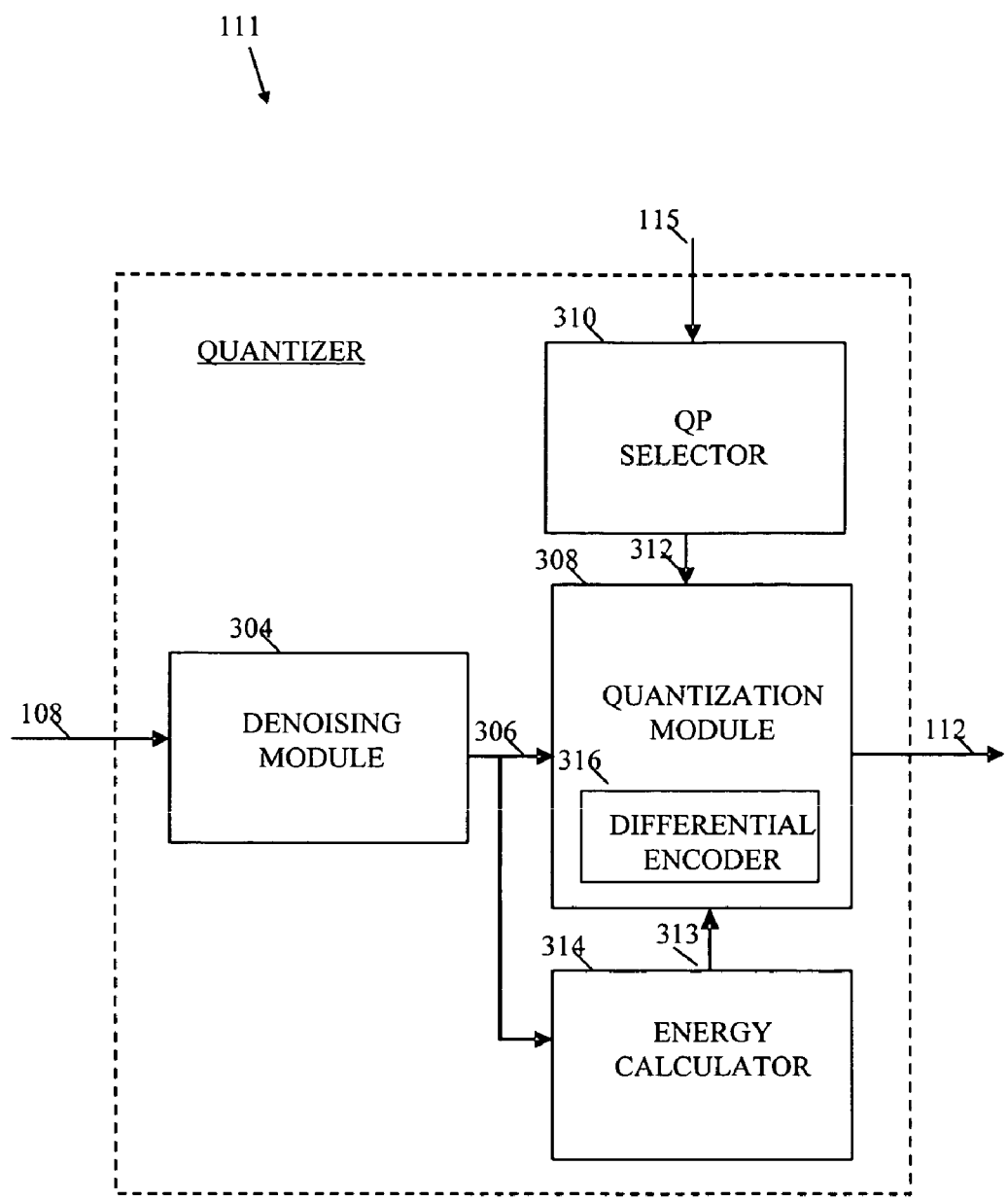
FIG. 3 is a block diagram illustrating one embodiment of the quantizer of FIG. 1, in accordance with the present invention.

Referring now to FIG. 3, a block diagram of the FIG. 1 quantizer 111 is shown, in accordance with one embodiment of the present invention. In alternate embodiments, quantizer 111 may be implemented using components and configurations in addition to, or instead of, certain of those components and configurations discussed in conjunction with the FIG. 3 embodiment.

In the FIG. 3 embodiment, quantizer 111 initially receives sets of coefficients corresponding to different subbands 108 from DWT module 110 (FIG. 1). In the FIG. 3 embodiment, a denoising module 304 performs a denoising procedure upon the received subbands 108 to produce denoised subbands 306 by removing all subband coefficients that are less than a predetermined denoising threshold value. Denoising module 304 then provides the denoised subbands to both quantization module 308 and energy calculator 314.

In the FIG. 3 embodiment, energy calculator 314 determines representative subband energy values 313 for each of the denoised subbands 306 by utilizing any effective techniques. For example, in certain embodiments, subband energy values may be average subband energy values for respective denoised subbands 306. Energy calculator 314 then provides the subband energy values 313 to quantization module 308. In the FIG. 3 embodiment, a quantization parameter (QP) selector 310 receives an initial quantization parameter 115 from entropy encoder 113 (FIG. 1) via a feedback loop. As discussed above in conjunction with FIG. 1, initial quantization parameter 115 may be selected according to any appropriate selection criteria. For example, initial quantization parameter 115 may be selected to provide a desired level of picture quality characteristics from encoder 100. QP selector 310 then provides the initial quantization parameter 115 to quantization module 308 via path 312.

In the FIG. 3 embodiment, quantization module 308 performs an adaptive quantization parameter calculation procedure to generate adaptive quantization parameters that are based upon appropriate factors. For example, in certain embodiments, the adaptive quantization parameter for a given denoised subband 306 may be based upon a corresponding initial quantization parameter 115, a subband energy level 313, and the particular subband level of the denoised subband 306. Various additional details and techniques for calculating adaptive quantization parameters are discussed below in conjunction with FIG. 4.

In the FIG. 3 embodiment, quantization module 308 may then utilize the adaptive quantization parameters to individually perform quantization procedures on respective denoised subbands 306 to thereby generate quantized subband coefficients 112 to entropy encoder 113 (FIG. 1). In the FIG. 3 embodiment, quantization module 308 may also selectively utilize a differential encoder 316 to perform differential encoding procedures on certain pre-defined ones of the quantized subband coefficients 112. Certain techniques for utilizing differential encoder 316 to perform differential encoding procedures are further discussed below in conjunction with FIG. 6A through FIG. 6D Referring now to FIG. 4, a diagram illustrating an adaptive quantization procedure is shown, in accordance with one embodiment of the present invention. The FIG. 4 embodiment is presented for purposes of illustration, and in alternate embodiments, the present invention may readily perform adaptive quantization procedures using techniques and configurations in addition to, or instead of, certain of those techniques and configurations discussed in conjunction with the FIG. 4 embodiment.

Figure 4:
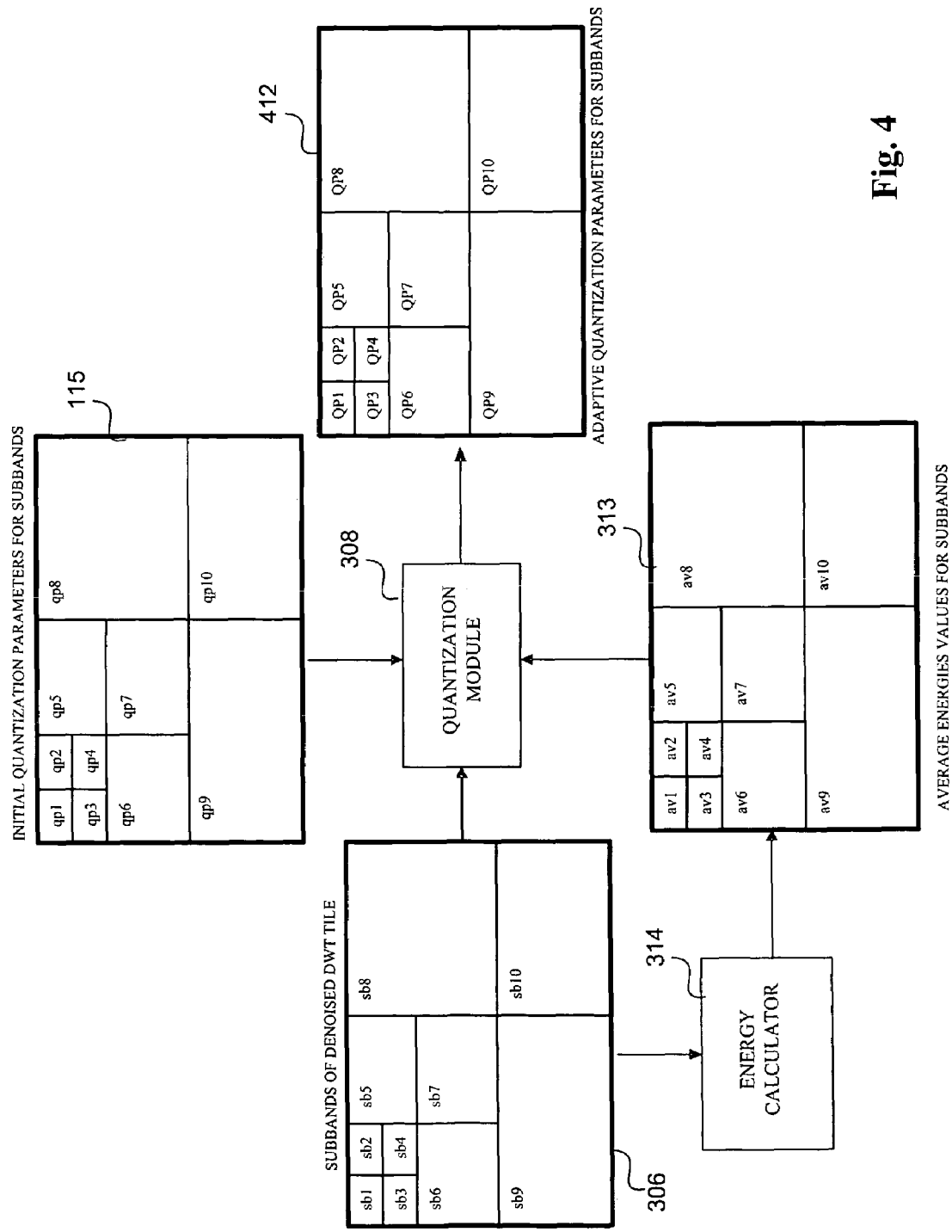
FIG. 4 is a diagram illustrating one embodiment of an adaptive quantization procedure, in accordance with the present invention.

In the FIG. 4 embodiment, a set of subbands 306 from an exemplary denoised tile are shown after being generated by DWT module 110 (FIG. 1). For purposes of illustration, in FIG. 4, subbands 306 are shown with ten subbands arranged in three subband levels. In particular, the FIG. 4 subbands 306 include a first, high subband level with subband 8 (sb8), subband 9 (sb9), and subband 10 (sb10). The FIG. 4 subbands 306 also include a second, medium subband level with subband 5 (sb5), subband 6 (sb6), and subband 7 (sb7). In addition, the FIG. 4 subbands 306 include a third, low subband level with subband 1 (sb1), subband 2 (sb2), subband 3 (sb3), and subband 4 (sb4). Each of the respective subbands 306 includes a series of individual subband coefficients that are generated by DWT module 110 (FIG. 1).

In the FIG. 4 embodiment, initial quantization parameters 312, adaptive quantization parameters 412, and average subband energies 313 are depicted in a drawing format that is similar to the drawing layout of subbands 306. In the FIG. 4 embodiment, each similarly located element of initial quantization parameters 312, adaptive quantization parameters 412, and average subband energies 313 are therefore intended to be associated with the correspondingly-positioned subbands sb1 through sb10 of subbands 306. For example, in the FIG. 4 drawing, pq1, QP1, and av1 are each intended to correspond with sb1 from subbands 306.

In the FIG. 4 embodiment, energy calculator 314 analyzes each of the subbands 306 to determine corresponding respective average energy values 313 for the respective subbands 306. In the FIG. 4 drawing, the average energy values 313 are depicted with the symbol "ay." Average energy values 313 therefore include values av1 through av10 that correspond with subbands sb1 through sb10 of subbands 306. In the FIG. 4 embodiment, energy calculator 314 may separately calculate an average energy value for each subband by calculating a sum of the modulus values for all denoised coefficients 306 in a given subband, and then dividing that sum by a total number of denoised coefficients 306 for that subband that are not equal to zero. In alternate embodiments, any other effective manner for representing energy levels of subbands 306 may also be utilized.

As discussed above in conjunction with FIGS. 1 and 3, quantization module 308 may receive a set of initial quantization parameters 115 from entropy encoder 113 (FIG. 1). In the FIG. 4 drawing, the initial quantization Parameters are depicted with the symbol "qp." Initial quantization parameters therefore include values qp1 through qp10 that correspond with subbands sb1 through sb10 of subbands 306.

In the FIG. 3 embodiment, quantization module 308 performs an adaptive quantization parameter calculation procedure according to any effective techniques to thereby generate adaptive quantization parameters 412 that are based upon appropriate factors. For example, in certain embodiments, the adaptive quantization parameter 412 for a given denoised subband 306 may be based upon a corresponding initial quantization parameter 115, a subband energy level 313, and the transform level of the particular denoised subband 306.

In the FIG. 4 embodiment, quantization module 308 may perform a comparison procedure that compares a modified subband energy value to a comparison QP value to determine the corresponding adaptive quantization parameter 412. In the FIG. 4 embodiment, the modified subband energy value may be a portion of the average subband energy 313 that is determined by dividing the subband level of the particular subband 306 by a reduction factor "p". For example, in certain embodiments, a high level subband 306 may have its average subband energy 313 divided by a low factor (e.g. a factor of 2), a medium level subband 306 may have its average subband energy 313 divided by a medium factor (e.g. a factor of 4), and a high level subband 306 may have its average subband energy 313 divided by a high factor (e.g. a factor of 6). In the FIG. 4 embodiment, the comparison QP values may be based upon the initial quantization parameters 115, or may alternately be modified from the initial quantization parameters 115 using any appropriate techniques.

In the FIG. 4 embodiment, quantization module 308 may then sequentially increment a given initial quantization parameter 115 until the corresponding modified subband energy value 313 is less than the associated comparison QP value. In certain embodiments, the foregoing comparison procedure may expressed as follows:

$$(AV\!>\!>\!p)\!>\!(1\!<\!<\!QP)$$

where (AV>>p) represents the modified average subband energy, and (1<<QP) represents the comparison QP value. The foregoing value "p" is the reduction factor, the symbol ">>" represents a binary double right shift (a division process), and the symbol "<<" represents a binary double left shift (a multiplication process).

In the FIG. 4 embodiment, after quantization module 308 calculates adaptive quantization parameters 412, then quantization module 308 may advantageously utilize the adaptive quantization parameters 412 to individually perform quantization procedures on respective denoised subbands 306 to thereby generate quantized subband coefficients 112 for processing by entropy encoder 113 (FIG. 1). The effective utilization of adaptive quantization procedures is further discussed below in conjunction with FIG. 7.

Figure 5:
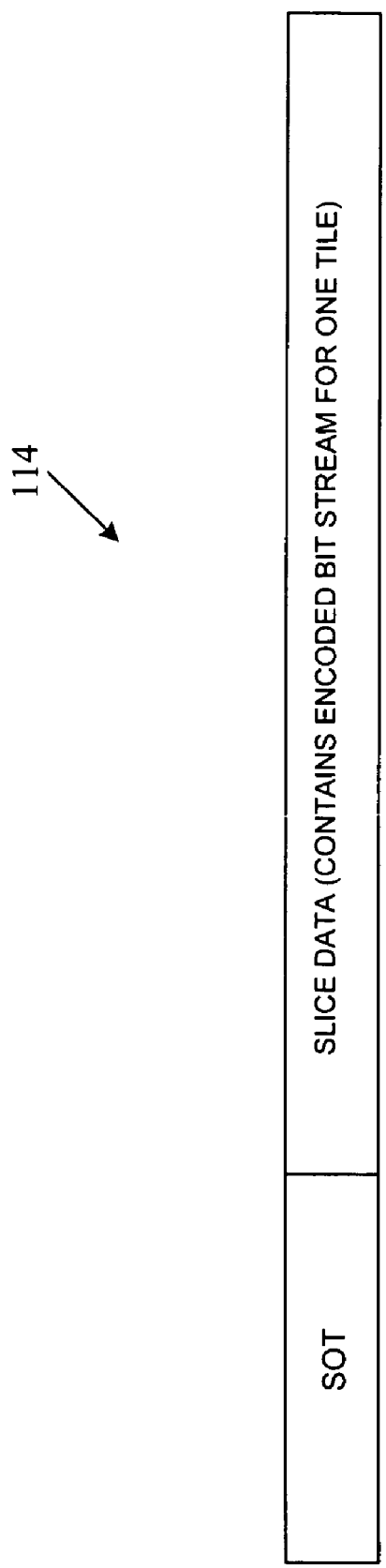
FIG. 5 is a diagram for one embodiment of encoded data, in accordance with the present invention.

Referring now to FIG. 5, a diagram for one embodiment of encoded data 114 is shown, in accordance with the present invention. In alternate embodiments, encoded data 114 may be implemented using components and configurations in addition to, or instead of, certain of those components and configurations discussed in conjunction with the FIG. 5 embodiment.

The FIG. 5 embodiment illustrates one exemplary data format for storing or transmitting encoded data 114 for each tile. The start-of-tile header (SOT) consists of various different selectable parameters that are used to reconstruct the tile and embed the tile into a current frame of image data. For example the SOT may include adaptive quantization parameters for the respective tile subbands, a differential encoding indicator, a length of the associated encoded information, and offset values to facilitate decoding procedures. The SOT is followed by slice data that includes an encoded bit stream corresponding to one associated tile. In the FIG. 5 embodiment, the slice data may be encoded in any appropriate format. To make the system more robust on lossy networks, the SOT header may add redundant error-correcting codes, thereby reducing the loss of data and improving the quality of the picture. The redundant error correction codes are added to each subband in a way such that the low resolution subbands have low error probability as compared to the higher subbands. This makes the images to be more robust to transmission errors while keeping the overall data rates low.

Referring now to FIGS. 6A through 6D, exemplary graphs illustrating a differential encoding procedure are shown, in accordance with one embodiment of the present invention. In alternate embodiments, differential encoding procedures may be performed using values and techniques in addition to, or instead of, certain of those values and techniques discussed in conjunction with the embodiments of FIGS. 6A-6D. In addition, FIGS. 6A-6D are presented herein to illustrate and discuss certain principles of the differential encoding procedures, and should not necessarily be construed to represent absolute scale drawings of the subject matter.

As discussed above in conjunction with the FIG. 3 embodiment, a quantization module 308 (FIG. 3) may selectively utilize a differential encoder 316 to perform differential encoding procedures on certain pre-defined ones of the quantized subband coefficients 112 after quantization module 308 has performed the adaptive quantization procedure with adaptive quantization parameters 412 (FIG. 4).

The FIG. 6A embodiment is an exemplary graph of pixel distribution with pixel values shown on a vertical axis and pixels shown on a horizontal axis. The FIG. 6A graph shows a pixel 0 with a value A, a pixel 1 with a value B, a pixel 2 with a value C, a pixel 3 with a value D, a pixel 4 with a value E, and a pixel 5 with a value F. The FIG. 6B embodiment is an exemplary graph showing the frequency distribution of the pixels of FIG. 6A. The FIG. 6B graph displays frequency on a vertical axis and pixel values on a horizontal axis.

The FIG. 6C embodiment is an exemplary graph illustrating the operation of a differential encoding procedure upon the pixels of FIG. 6A. The FIG. 6C graph displays pixel values on a vertical axis and pixels on a horizontal axis. The FIG. 6C graph has a pixel 0 with a value A, a pixel 1 with a value B−A, a pixel 2 with a value C−B, a pixel 3 with a value D−C, a pixel 4 with a value E−D, and a pixel 5 with a value F−E. The FIG. 6D embodiment is an exemplary graph showing the frequency distribution of the pixels of FIG. 6D. The FIG. 6D graph displays frequency on a vertical axis and pixel values on a horizontal axis. Additional information regarding differential encoding techniques may be found on the Internet at: "http://einstein.informatik.uni-oldenburg.de/rechner-netze/dpcm.htm."

In certain embodiments, quantizer 111 performs differential encoding procedures only on quantized coefficients 112 of certain pre-defined lower subband levels. For example, if denoised subbands 306 (FIG. 4) include a first, high subband level, a second, middle subband level, and a third, low subband level, then differential encoding may be applied to quantized coefficients 112 from only the third, low subband level. Alternately, differential encoding may be applied to quantized coefficients 112 from both the second, medium subband level, and the third, low subband level. In various other embodiments, any number of total subband levels are equally contemplated (for example, five subband levels). Similarly, any other appropriate selection of specific pre-defined subband levels for differential encoding is possible. Additional details for performing differential encoding procedures are further discussed below in conjunction with FIG. 7.

Figure 7:
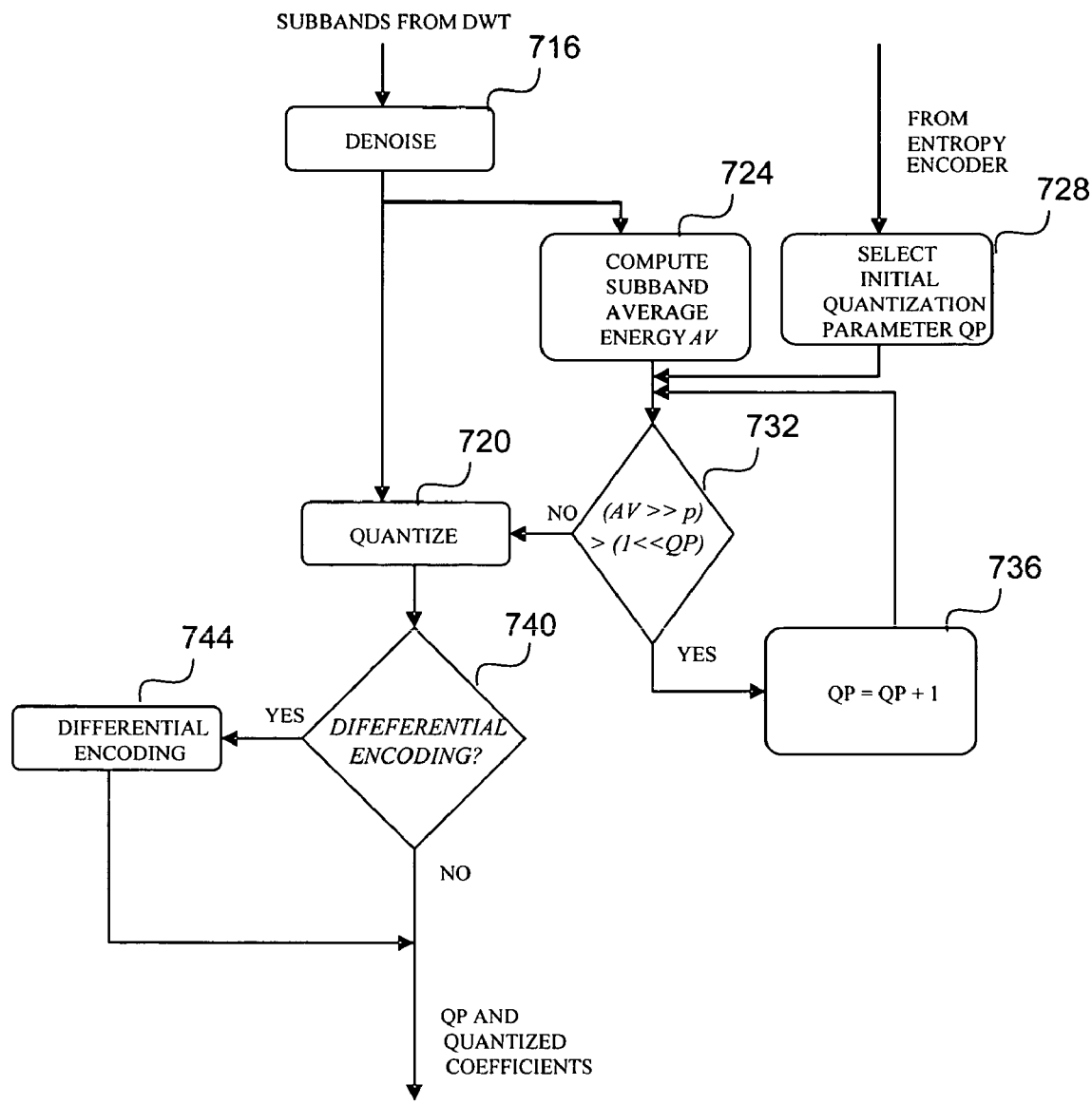
FIG. 7 is a flowchart of method steps for performing an adaptive quantization procedure, in accordance with one embodiment of the present invention.

Referring now to FIG. 7, a flowchart of method steps for performing an adaptive quantization procedure is shown, in accordance with one embodiment of the present invention. However, in alternate embodiments, the present invention may readily utilize steps and sequences other than certain of those steps and sequences discussed in conjunction with the FIG. 7 embodiment.

In the FIG. 7 embodiment, a quantizer 111 initially receives image data in the form of subbands 108 from a discrete wavelet transform (DWT) module 110. In step 716, a denoising module 304 of quantizer 111 performs a denoising procedure to remove those subband coefficients that are less than a predetermined denoising threshold value. The denoising module 304 then provides the denoised subbands 306 to a quantization module 308 and to an energy calculator 314.

In step 724, the energy calculator 314 determines an average subband energy value (AV) 313 for each denoised subband 306 by utilizing any appropriate techniques. In step 728, a QP selector 310 selects initial quantization parameters 115 based upon feedback from an entropy encoder 113, and provides the initial quantization parameters 115 to the quantization module 308. In step 732, the quantization module 308 initially calculates modified average subband energy values (AV>>p) by dividing the average subband energy values 313 by corresponding respective reduction factors (p). In the FIG. 7 embodiment, the reduction factors may be implemented as selectable values that correspond to the subband level of a given denoised subband 306. For example, a high subband level may be associated with a low reduction factor, a medium subband level may be assigned a medium reduction factor, and a low subband level may be associated with a high reduction factor.

In step 732, quantization module 308 also calculates comparison QP values (1<<QP) for each denoised subband 306 based upon current quantization parameters that are initially equal to the initial quantization parameters 115 provided by the QP selector 310. Then, in step 732, the quantization module 308 performs a comparison procedure, on a subband-by-subband basis, to determine whether a respective modified average subband energy (AV>>p) is greater than a corresponding comparison QP value (1<<QP). If the modified subband energy is greater than the comparison QP value, then in step 736, quantization module 308 iteratively increments the current quantization parameter by a value of one. The FIG. 7 process may then return to repeat foregoing step 732.

However, in step 732, if the modified subband energy is not greater than the comparison QP value, then in step 720, quantization module 308 utilizes the current quantization parameter as a final adaptive quantization parameter 412 for performing an adaptive quantization procedure to generate quantized coefficients 112 for the corresponding subband. In step 740, quantization module 308 determines whether to perform a differential encoding procedure on each set of quantized coefficients 112 by analyzing the subband level of each set of quantized coefficients 112. For example, quantization module 308 may be programmed to perform differential encoding only on one or more low subband levels because of their relatively high number of non-zero coefficients.

In step 740, if quantization module 308 determines that differential encoding is required, then in step 744, a differential encoder 316 performs a differential encoding procedure on the appropriate sets of quantized coefficients 112. Quantization module 308 may then provide the quantized coefficients and the adaptive quantization parameters for all subbands to the entropy encoder 113 for further processing. The present invention therefore provides an improved system and method for effectively performing an adaptive quantization procedure.

Figure 8:
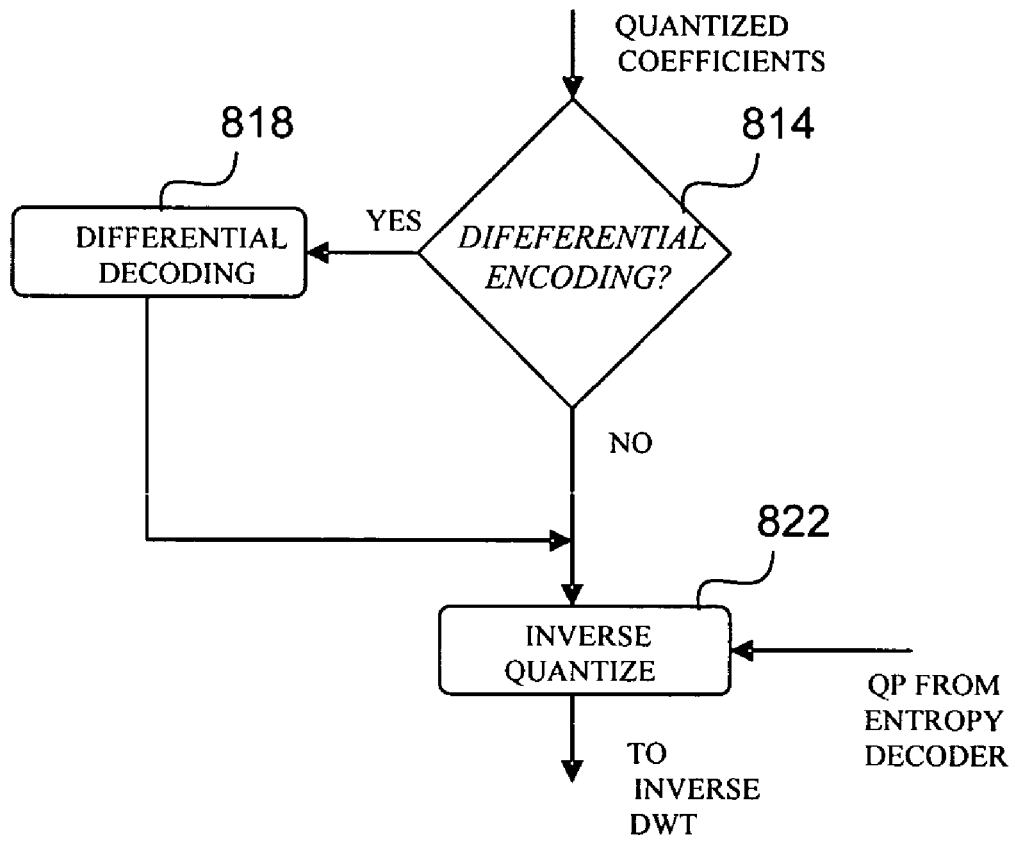
FIG. 8 is a flowchart of method steps for performing a dequantization procedure, in accordance with one embodiment of the present invention.

Referring now to FIG. 8, a flowchart of method steps for performing a dequantization procedure is shown, in accordance with one embodiment of the present invention. However, in alternate embodiments, the present invention may readily utilize steps and sequences other than certain of those steps and sequences discussed in conjunction with the FIG. 8 embodiment.

In the FIG. 8 embodiment, a dequantizer 204 initially receives sets of quantized coefficients 203 from an entropy decoder 202. In step 814, the dequantizer 204 analyzes the sets of quantized coefficients 203 to determine which have been subject to a differential encoding procedure. Then in step 818, dequantizer 204 performs a differential decoding procedure upon appropriate ones of the sets of quantized coefficients 203.

In step 822, dequantizer 204 initially receives adaptive quantization parameters 412 corresponding to the sets of quantized coefficients 203 from the entropy decoder 202. In the FIG. 8 embodiment, the adaptive quantization parameters 412 were extracted from encoded data 114 by entropy encoder 202. Finally, in step 822, dequantizer 204 performs an inverse quantization procedure upon the sets of quantized coefficients 203 by utilizing respective corresponding adaptive quantization parameters 412. The dequantized subband coefficients may then be provided to an inverse DWT module 205 for appropriate further processing.

The invention has been explained above with reference to certain embodiments. Other embodiments will be apparent to those skilled in the art in light of this disclosure. For example, the present invention may readily be implemented using configurations and techniques other than certain of those described in the embodiments above. Additionally, the present invention may effectively be used in conjunction with systems other than certain of those described above. Therefore, these and other variations upon the discussed embodiments are intended to be covered by the present invention, which is limited only by the appended claims.

What is claimed is:

1. A system for performing an adaptive quantization procedure, comprising:
    an energy calculator that determines energy values for subbands of input data; and
    a quantizer that receives initial quantization parameters that each correspond to a different respective one of said subbands, said quantizer calculating adaptive quantization parameters from said initial quantization parameters by utilizing corresponding ones of said energy values, said quantizer then utilizing said adaptive quantization parameters to generate quantized coefficients for said subbands during said adaptive quantization procedure.

2. The system of claim 1 wherein said input data includes image data that is configured in a digital image data format.

3. The system of claim 1 wherein a discrete wavelet transform module performs a discrete wavelet transform procedure to transform said input data into said subbands.

4. The system of claim 1 wherein an entropy encoder processes said quantized coefficients to produce encoded data, said entropy encoder also selecting said initial quantization parameters based upon desired image quality characteristics of said encoded data, said entropy encoder then providing said initial quantization parameters to said quantizer via a feedback loop.

5. The system of claim 1 wherein said quantizer outputs said adaptive quantization parameters and said quantized coefficients for said subbands.

6. The system of claim 1 wherein said quantizer includes a denoising module that removes coefficients of said subbands that are less than a pre-defined noise threshold value.

7. The system of claim 1 wherein said quantizer includes a differential encoder that performs a differential encoding procedure upon pre-defined ones of said quantized coefficients of said subbands.

8. The system of claim 7 wherein said differential encoding procedure is performed only on said pre-defined ones of said quantized coefficients that are from lower-level subbands.

9. The system of claim 1 wherein said energy calculator separately determines an average energy value for a given subband by calculating a sum of modulus values for all denoised coefficients in said given subband, and then dividing said sum by a total number of non-zero denoised coefficients for said given subband.

10. The system of claim 9 wherein said quantizer calculates a modified average energy value for said given subband by dividing said average energy value by a reduction value.

11. The system of claim 10 wherein said modified average energy value is expressed as (AV>>p), where AV is said average energy value, and p is said reduction value.

12. The system of claim 10 wherein said reduction value is selected depending upon a subband level of said given subband, a high reduction factor being selected for a high-level subband, a medium reduction factor being selected for a medium-level subband, and a low reduction factor being selected for a low-level subband.

13. The system of claim 10 wherein said quantizer calculates a comparison QP value for said given subband, said comparison QP value being derived from a current quantization parameter that is initially equal to a corresponding one of said initial quantization parameters.

14. The system of claim 13 wherein said comparison QP value is expressed as (1<<QP), where QP is said current quantization parameter.

15. The system of claim 13 wherein said quantizer performs a comparison procedure to determine whether said modified average energy value is greater than said comparison QP value.

16. The system of claim 15 wherein said quantizer increments said current quantization parameter by a value of one if said modified average energy value is greater than said comparison QP value, said quantizer then repeating said comparison procedure.

17. The system of claim 16 wherein said quantizer utilizes said current quantization parameter as a corresponding one of said adaptive quantization parameters if said modified average energy value is not greater than said comparison QP value.

18. The system of claim 1 further comprising a dequantizer that performs a dequantization procedure upon said quantized coefficients, said dequantizer reversing individual process steps performed by said quantizer to thereby regenerate said subbands.

19. The system of claim 18 wherein said dequantizer performs a differential decoding procedure upon said quantized coefficients of said subbands that have previously been differentially encoded by said quantizer.

20. The system of claim 18 wherein an entropy decoder extracts said adaptive quantization parameters from encoded data, said entropy decoder providing said adaptive quantization parameters to said dequantizer for performing an inverse quantization procedure upon said quantized coefficients.

21. The system of claim 18 wherein said adaptive quantization procedure provides an encoding mechanism that dynamically adapts compression ratios for successive tiles based upon corresponding available varying bandwidths of one or more downstream networks.

22. A method for performing an adaptive quantization procedure, comprising:
   determining energy values for subbands of input data by utilizing an energy calculator;
   using a quantizer for:
   generating initial quantization parameters that each correspond to a different respective one of said subbands;
   calculating adaptive quantization parameters from said initial quantization parameters by utilizing corresponding ones of said energy values; and
   utilizing said adaptive quantization parameters to generate quantized coefficients for said subbands during said adaptive quantization procedure.

* * * * *